Patented May 10, 1927.

1,628,522

UNITED STATES PATENT OFFICE.

WILHELM VERSHOFEN, OF BAMBERG, GERMANY.

PROCESS FOR THE PRODUCTION OF CERAMIC PRODUCTS.

No Drawing. Application filed September 26, 1923, Serial No. 665,009, and in Germany September 27, 1922.

My invention relates to the production of ceramic products and more particularly to the manufacture of sintered clay articles in an efficient and economical manner.

In the production of ceramic articles it has heretofore been proposed to effect cementing or silicating of clays before molding thereof by the addition thereto of water soluble fluorides, the fluorides rendering the molded articles capable of setting.

It has been found that with certain clays the reaction due to the presence of a water soluble fluoride is very weak, proceeding very slowly and only to a limited extent, while with some clays the reaction does not occur at all. Numerous experiments have shown that the purer the clay, the more difficult it is to produce a cementing or silicating of the clay resulting from the reaction of the fluoride. The reason for such inactivity of water soluble fluorides on certain clays appears to be that the fluorides do not act directly upon the clay but only through the intermediary of the quartz or silica contained in the clay. Consequently in the processing of clays which are devoid or contain an insufficient amount of silica, the addition of a fluoride is with little or no effect since the desired reaction can not proceed to a sufficient extent.

According to the present invention, the free silica which may be present in the clay is increased in order to ensure the action of the fluoride in bringing about the desired silicating or cementing. Where the clay is low in or free of quartz, silica is added thereto prior to molding in an amount sufficient to cause fluxing of the fluoride so that on sintering a binder will be formed and a glaze will be produced on the surface of the article.

It has been found that with addition of a comparatively low percentage of soluble fluoride to the clay, only a part of the added silica reacts with the fluoride while the remaining silica is acted upon by nascent hydrofluoric acid set free in the reaction between the soluble fluoride and the first part of the silica referred to. The silica then is acted upon both by the soluble fluoride and liberated hydrofluoric acid.

The primary reaction between the silica and fluoride may be expressed by the following equation:

$$2NaF + SiO_2 + H_2O = Na_2SiO_3 + 2HF$$

and, as stated above, when only a small percentage of fluoride is added to the clay so that there remains an excess of silica, the excess silica is acted upon in a secondary reaction by the hydrofluoric acid liberated in the first reaction according to the above equation. The secondary reaction probably proceeds according to either one or possibly both of the following equations:

$$SiO_2 + 4HF = 2H_2O + SiF_4$$
$$SiO_2 + 6HF = 2H_2O + H_2SiF_6$$

After treatment as above described, the mass is molded in any suitable manner and fired, the firing requiring only a comparatively short time owing to the addition of the soluble fluoride and it may be carried out at a comparatively low degree of heat, for example, between 600° and 900° C. The sintering of the mass is effected at a lower temperature than is required for the clay alone.

By the addition of a higher percentage of fluoride to the mass, a bright glaze-like layer is formed on the surface of the article during the firing, the fluoride serving as a flux and binder at the elevated temperature producing sintering of the clay. It will be seen then that since by the use of a higher percentage of fluoride a glaze is produced on the surface of the article, it is unnecessary to resort to additional treatment for effecting a glaze, such treatment being eliminated by the present invention. The glaze obtained according to the present invention is much more intimately associated with the core of the article than a glaze obtained by previously known processes.

By treatment in the foregoing manner, however, it is possible that even at a moderate temperature a total softening or fusion of the mass may occur which must be avoided in order to preserve the shape of the molded article. To prevent such softening or fusion, according to the present invention, a calcium salt is added to the charge, the calcium salt combining with the water soluble fluoride to form compounds which prevent the fluorides from leading to complete vitrification of the body. The addition of calcium salts together with the soluble fluorides presents a further advantage in the color of the article after baking. Such clays which normally turn to a reddish color on baking are found to be white in color after baking when an addition of calcium salt has been made to the charge. Clays which are colored black by reason of contact of the charge with iron, for example the iron contained in the stirring mechanism, are effected in such a manner by the calcium salts that the baked article does not show iron spots.

The proportions of materials to be used according to this invention vary greatly with the chemical composition of the clay used, and with the amounts of quartz and flux contained therein. Clays found in different localities vary greatly as to their chemical composition and it is therefor impossible to state any one set of proportions or any limits therefor, since proportions suitable for one specific clay may not be as suitable or not at all suitable for another specific clay.

My invention is generic with respect to practically all clays, and it is accordingly impossible to state the most preferred proportions; and in fact any statement of proportions for one type of clay may not aid in explaining my invention with respect to other types of clay.

For example, with some clays I can use 27% of clay, 60% of silicic acid (quartz), 10% of a soluble fluoride, and 3% of a calcium salt. These proportions will have to be varied greatly, not only according to the chemical composition of the clay, but according to how refractory the clay happens to be. If the clay be somewhat refractory, then the calcium salt might perhaps be reduced to 1%, the quartz to 50%, or if such quartz is naturally present, then much less would need to be added.

A somewhat generally applicable formula might perhaps be: 50% to 60% of silicic acid (quartz), 1% to 10% of a soluble fluoride, 1% to 3% of a calcium salt, the balance of clay.

It is to be understood, however, that while I have stated this formula to be generally applicable it may need to be varied, according to the type of clay used; but a more general formula cannot be stated. I, therefore, do not wish such formula or the proportions given to limit the scope of my invention.

According to prior processes of preparing ceramic masses, the charge was usually subjected to a wet mixing in tossing tubs and in washing plants with the resultant inconvenience that excess water had to be pressed out in expensive filter presses. Such inconveniences are eliminated by the process of the present invention.

According to my improved process, the clay is first crushed, finely sifted in any convenient manner, and mixed in a dry state with quartz and a water soluble fluoride, the amounts of quartz and fluoride depending upon and varying with the particular clay being processed. After the mixing of the charge, there is mixed therewith only the minimum amount of water which is necessary for the molding, stamping, or pressing of the raw mass. In this manner the necessity of subsequent homogenization is eliminated as the mass is sufficiently homogenized during the mixing. After the mixing stage the material is directly moldable and pressable and after molding or pressing, it is air dried in any suitable apparatus whereby the first stage of the process is completed.

The first stage of the manufacture presents essential advantages over the production of earthenware and porcelain as heretofore known. The entire plant consisting of tossing tubs, washing channels, homogenizing apparatus, and filter presses with the accompanying expensive consumption of filter cloth, is no longer necessary. Further, the crushing and sifting of the charge preparatory to the molding requires only about a half hour while each of the mixing steps, that is the dry mixing and the mixing with water, requires but about fifteen minutes so that not more than one and a half hours are consumed from the beginning of the manufacture to the production of the molded article. This means an economy of several days in comparison with the production of the molded article according to the usual manufacture of earthenware and porcelain.

The second stage of the manufacture is quite simple. The molded article, after air drying for about eight days, is brought directly into the fire and can be readily glazed and removed at a comparatively low temperature of about 900° C. The article thus produced is harder than porcelain and earthenware as prepared according to prior processes.

The second stage of the manufacture also presents important advantages over known processes. A separate glaze-baking of the article is eliminated, the article being heated but once and then at a comparatively low temperature. Further, the entire plant required for putting on a glaze is omitted thereby avoiding all opportunities for loss which result from the repeated charging and discharging of the oven, etc.

It will therefore be seen that the production of ceramic articles according to the process of the present invention affords many economic advantages consisting in facilitating and accelerating the production, economy in time and fuel, and in the avoiding of loss by breakage and the like.

Having described my invention, what I claim is:—

1. The process of making sintered clay articles which comprises adding a soluble fluoride to the clay, increasing the free silica which may be present in the clay to an amount sufficient to ensure the silicating or cementing action of said fluoride and thereby to act as a binder on sintering, and sintering at a lower temperature than is required for the clay alone.

2. The process of making sintered clay articles which comprises adding a soluble fluoride to the clay, increasing the free silica which may be present in the clay to an amount sufficient to cause said fluoride to flux therewith, the amount of fluoride present and the corresponding amount of silica being such that on sintering a binder will be formed and a glaze will be formed on the surface of the article, and sintering at a lower temperature than is required for the clay alone.

3. The process of making sintered clay articles which comprises adding a soluble fluoride to the clay, increasing the free silica which may be present in the clay to an amount sufficient to cause said fluoride to flux therewith and thereby to act as a binder on sintering, adding a calcium salt to the mass to prevent fusion, and sintering at a lower temperature than is required for the clay alone.

4. The process of making sintered clay articles which comprises adding a soluble fluoride to the clay, increasing the free silica which may be present in the clay to an amount sufficient to cause said fluoride to flux therewith, the amount of fluoride present and the corresponding amount of silica being such that on sintering a binder will be formed and a glaze will be formed on the surface of the article, adding a calcium salt to the mass to prevent fusion, and sintering at a lower temperature than is required for the clay alone.

5. The process which comprises crushing clay, finely sifting it, adding a soluble fluoride thereto, increasing the free silica which may be present in the clay to an amount sufficient to ensure the silicating or cementing action of said fluoride and thereby to act as a binder on sintering, the minimum amount of water required for molding the mass being added, mixing in a dry mixing machine, molding, air drying the molded articles, and sintering at a lower temperature than is required for the clay alone.

In testimony whereof, I have signed my name to this specification at Munich, Germany, this 11th day of September, 1923.

WILHELM VERSHOFEN.